Figure 1:
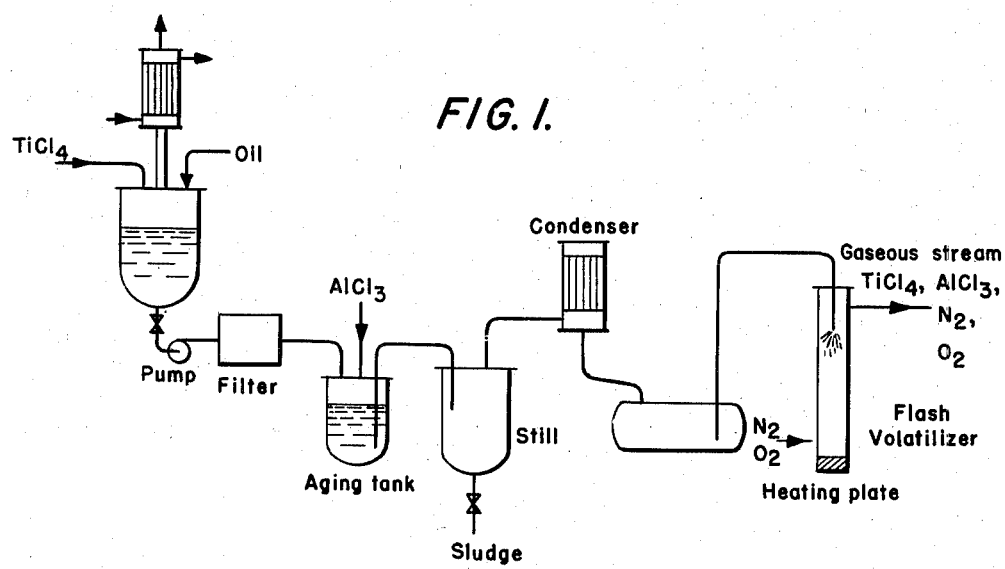

INVENTORS.
GUY C. MARCOT
SELDON P. TODD
BY STEPHEN A. LAMANNA

ATTORNEY

2,824,050

PREPARATION OF GASEOUS STREAMS COMPRISING TiCl$_4$ AND AlCl$_3$

Guy C. Marcot, Morris Plains, N. J., and Seldon P. Todd and Stephen A. Lamanna, Amherst, Va., assignors, by mesne assignments, to Fabriques de Produits Chimiques de Thann et de Mulhouse, Thann (Haut-Rhin), France, a corporation of France Application August 25, 1954, Serial No. 452,222

8 Claims. (Cl. 202—57)

The present invention relates to the formation of gaseous titanium tetrachloride - aluminum trichloride streams, and further relates to methods of producing gaseous streams of constant composition from liquid titanium tetrachloride-aluminum trichloride solutions in which the weight of aluminum trichloride is between about 0.1% and 5% of the weight of the titanium tetrachloride. The invention includes methods for producing gaseous streams of the type described containing minor amounts of other volatile combustible halides.

The gaseous streams referred to are useful in that they can be reacted with oxygen at elevated temperatures to form titanium dioxide of pigmentary grade.

In the manufacture of pigmentary titanium dioxide by combustion of a gaseous stream of titanium tetrachloride with oxygen, it is known that certain pigmentary properties of the titanium dioxide are much enhanced when the titanium tetrachloride gaseous stream contains a small amount (typically 0.1%–5% by weight) of aluminum trichloride. Generally, a gaseous stream of titanium tetrachloride containing 0.1%–5% by weight of aluminum chloride and, if desired, minor amount of other volatile chlorides, is passed into a refractory combustion tube maintained at 1000°–1500° C. and reacted with oxygen therein. The titanium tetrachloride-aluminum chloride mixture (diluted with nitrogen or other inert gas, if desired) and oxygen may be preheated to about 700° C., in which case these gases are generally admitted separately, or the two streams may be premixed and admitted at a substantially lower temperature, additional heat being supplied by separate combustion of carbon monoxide and oxygen, electrical resistance windings, etc. The products of the reaction are principally titanium dioxide pigment particles containing a minor amount of aluminum oxide and chlorine gas.

The use of materially less than 0.1% of aluminum trichloride generally fails to give the desired improvements, while the use of more than about 5% is apparently without additional benefit.

In the past, titanium tetrachloride-aluminum trichloride gaseous streams have been prepared by forming a stream of titanium tetrachloride gas, separately forming a stream of aluminum trichloride gas, and combining the two streams in suitable ratio. It is known, however, that the quality of titanium dioxide produced by combustion of titanium tetrachloride-aluminum trichloride mixtures changes significantly with minor changes in the ratio of aluminum chloride present, and that formation of a stream of the two gases in constant ratio by the method described is very difficult because the method requires among other things precise control of the temperature, pressure, and metering of the separate gases. As a result, titanium dioxide pigment produced by combustion of a gaseous stream formed by this method has fluctuated in quality.

It has been proposed to dissolve the aluminum trichloride in hot liquid titanium tetrachloride, and to form a gaseous stream containing the two materials by bubbling air or oxygen through the solution, or to form the stream by subjecting the solution to ordinary distillation. One principal difficulty results from the fact that the boiling points of the two components are widely different, titanium tetrachloride boiling at 136° C. and aluminum trichloride boiling at 183° C. (752 mm.). This causes the composition of the gaseous stream evolved during the volatilization or distillation to vary, the aluminum trichloride volatilizing or distilling more slowly than the titanium tetrachloride.

Moreover, commercial aluminum trichloride contains one or more impurities which react with titanium tetrachloride. When such aluminum trichloride is dissolved in hot titanium tetrachloride, an insoluble, non-volatile residue forms as a floc which obscures the sight glasses of liquid flow rotometers and deposits in lines and valves when the solution is pumped in the ordinary way. This floc may be an aluminum hydrate resulting principally from the presence of a small amount of combined water in the aluminum chloride, but because of the slowness with which it forms may have some other composition.

The discovery has now been made that a gaseous stream of uniform composition can be prepared from titanium tetrachloride and aluminum chloride while obviating the above-mentioned difficulties by dissolving 0.1%–5% of the aluminum chloride in the titanium tetrachloride, distilling the mixture, condensing and combining the distillate, and continuously flash volatilizing said distillate. When crude aluminum trichloride is used, the solution is aged until formation of floc is substantially complete, after which the solution is distilled, with or without filtration. The ratio of TiCl$_4$ to AlCl$_3$ in the gaseous stream after the flash volatilization is the same as the TiCl$_4$–AlCl$_3$ ratio in the liquid fed before it is volatilized.

The foregoing results can also be attained by continuously supplying a liquid titanium tetrachloride-aluminum trichloride solution to a still, continuously distilling the solution therein, and maintaining the rate of supply of said solution to said still substantially equal to the rate at which the solution is distilled. After equilibrium has been attained in the still, the TiCl$_4$:AlCl$_3$ ratio in the evolved gaseous stream is the same as the TiCl$_4$:AlCl$_3$ ratio in the feed to the still. When commercial aluminum trichloride is used, the solution is aged before distillation to allow development of floc.

The liquid titanium tetrachloride-aluminum trichloride solutions may be filtered to remove the non-volatile floc before the distillation step, whereby the still is maintained substantially free from non-volatile matter. It is a feature of the invention, however, that this result may also be substantially accomplished by bleeding off periodically or preferably constantly a portion of the distilland from the bottom of the still so as to maintain the concentration of sludge in the still at an acceptably low value. Most advantageously, the distilland thus bled off is cooled to about room temperature, whereby the amount of floc or other solid matter therein is increased, and is then filtered. The filtrate, upon adjustment of its TiCl$_4$:AlCl$_3$ ratio to correspond with that of the feed to the still, is returned to the still. In this modification the rate at which the solution is supplied to the still is increased so that the volume of distilland in the still remains substantially constant.

It is known that titanium tetrachloride prepared by chlorination of ilmenite ores is normally contaminated with a small amount of color-forming impurities including vanadium chloride or oxychloride. It is further known that these impurities may be rendered non-volatile by heating the titanium tetrachloride with a small amount of an organic carbonizing or polymerizing agent until a char or polymer forms which either adsorbs the impurities or renders them non-distillable (cf. U. S. Patents Nos. 2,230,538 and 2,592,021). It is a feature of the present invention that this method of purification may be performed simultaneously with the above-described step of aging, the organic carbonizing or polymerizing agent being added along with the aluminum chloride to the hot titanium tetrachloride. Formation of char or polymer and floc take place simultaneously in about the same time.

As carbonizing or polymerizing agents, there may be employed finely-divided rubber, art gum, soya bean oil, Russian mineral oil, a glyceride oil or fat, linseed oil, diesel oil, castor oil, crude petroleum, anthracene, and benzene. Automotive engine lubricating oil is preferred, this material being very effective and readily available.

More in detail, the principal steps of the process are generally advantageously performed as follows.

The purification step is performed by adding to the titanium tetrachloride a weight of organic matter, normally about equal to or slightly more than the weight of vanadium chloride or oxychloride therein, and heating the mixture, preferably at or near reflux, until formation of a char is substantially complete or until the vanadium compounds have become non-volatile. The aluminum trichloride is most conveniently added while the titanium tetrachloride is hot and along with the organic matter, as the step of aging the solution to cause formation of the above-described floc is then combined with the step of converting the organic material into a char, which normally takes somewhat longer.

When the step of adding organic matter is omitted, or when the aluminum trichloride is added after the action of the organic matter is complete, the resulting mixture is aged to allow development of the non-volatile floc referred to, resulting from action of the aluminum trichloride upon the titanium tetrachloride. Development of this floc usually takes 24 hours or more at room temperature, but is greatly accelerated as the temperature is increased. Between about 125° C. and the reflux temperature of the solution this usually requires at least 20–90 minutes, and a longer period does no harm. We therefore prefer to heat the solution near reflux for 90–120 minutes to ensure complete development of the floc before the solution is pumped through valves and rotometers.

The further steps may be performed according to different modifications as follows.

According to one modification, the solution is filtered hot and the filtrate distilled at atmospheric pressure at a temperature of 136–145° C. or more, depending on the amount of aluminum chloride present. The distillate is condensed and combined. If desired, a small amount of silicon tetrachloride or other volatile halide known to improve the properties of the pigment may be added at this point. The liquid condensate is then fed into a flash vaporizer of any common type at such uniform rate that all the constituents of the liquid vaporize essentially simultaneously. Any conventional form of flash volatilizing apparatus may be used, such as a hot plate electrically heated to about 300° C. upon which the liquid is allowed to drop, or a vertical column supplied with a rising current of gas at about 300° C., into which the liquid is sprayed. The stream of gas leaving the volatilizer is of uniform composition and substantially no solid matter collects therein.

According to another modification, the aged, filtered, titanium tetrachloride-aluminum trichloride solution is continuously fed into a still and continuously distilled therein at atmospheric pressure, the rate of feed to the still being substantially equal to the rate at which distillation takes place so as to maintain the volume of distilland substantially constant. After equilibrium has become established in the still, the composition of the gaseous stream evolved is the same as the liquid supplied to the still.

In this modification, it is advantageous to provide the still, condenser and storage tanks in duplicate, thus permitting the condensed liquid to be supplied to the volatilizer without interruption.

In this modification, the step of filtration may be omitted, and the char and floc removed by continuously bleeding off a portion of the distilland from the bottom of the still. The distilland bled off is cooled to 20–30° C. or lower, whereupon additional material separates and is filtered. The filtrate is returned to the still after addition of aluminum trichloride equivalent in amount to that removed.

According to a still further modification, a titanium tetrachloride-aluminum trichloride solution which may contain, if desired, other volatile metal halides of the type referred to, is aged with addition of organic matter as described, filtered, and fed directly into a flash volatilizer. The resulting gaseous stream contains titanium tetrachloride and aluminum trichloride in the same ratio as in the liquid fed to the volatilizer.

The resulting titanium tetrachloride-aluminum chloride gaseous streams are well-adapted for combustion to titanium dioxide by any previously known method, including those disclosed in U. S. Patent Nos. 2,394,633, 2,445,691, 2,502,347, and 2,635,946, and British Patent Nos. 686,570, 673,782, and 661,685.

Figure 2:
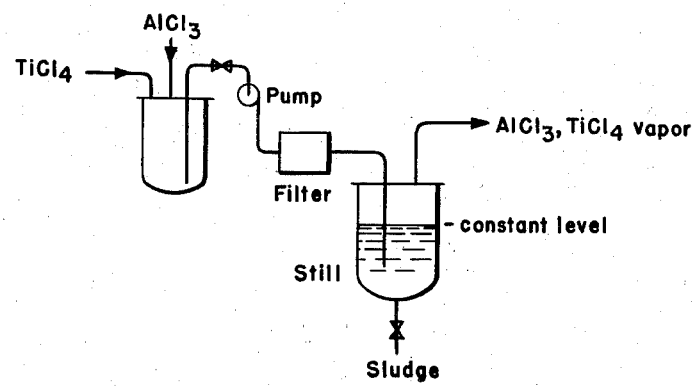

The accompanying diagrammatic flow sheets, designated as Fig. 1 and Fig. 2, illustrate embodiments of the invention set out in greater detail in the examples.

In Fig. 1, titanium tetrachloride and purifying agent (e. g. oil) are introduced into the boiler 11 provided with a reflux cooler 12 and heated to boiling until the purification is completed. Then the titanium tetrachloride is forced by pump 13 through filter 14 into the aging tank 15. Aluminum chloride, in the desired amount, is dissolved in the hot titanium tetrachloride and the solution stays in 15 until the formation of flocs is substantially completed. While still hot, the content of 15 is then transferred to still 16 and from there almost entirely distilled over, through condenser 18, to storage tank 19. The sludge remaining in still 16 is flushed out through valve 17 to titanium tetrachloride recovery (not shown). The titanium tetrachloride of tank 19, containing the aluminum chloride, is fed continuously to flash volatilizer 20 where it is entirely volatilized by a hot oxygen-nitrogen mixture. The gaseous stream leaving 20 contains titanium tetrachloride and aluminum chloride in almost the same ratio as in tank 19.

Fig. 2 shows another embodiment of the invention whereby the solution of aluminum chloride in titanium tetrachloride of aging tank 15 (Fig. 1) is continuously withdrawn by pump 21 and fed through filter 22 to still 23 where the solution is evaporated. The feeding rate and the boiling rate of still 23 are correlated in such a manner as to maintain a constant level in 23. Upon reaching the dynamic equilibrium between incoming liquid mixture and outgoing vapor mixture, the

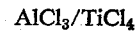

ratio of both incoming liquid and outgoing vapor is substantially the same. In the still, the $AlCl_3/TiCl_4$ ratio will be about 1.4 times that of the incoming mixture. The vapor mixture leaves the still by conduit 24 and, if desired, may be mixed with other gases or vapors. Any sludge which may be formed in still 23 is continuously or periodically withdrawn through valve 25.

The invention will be further illustrated by the examples which follow. These examples are embodiments of the invention and are not to be construed in limitation thereof.

*Example 1*

Crude liquid titanium tetrachloride was produced by chlorinating an ilmenite ore to form a gaseous stream containing titanium tetrachloride, aluminum chloride, iron chloride, silicon chloride, and small amounts of color-forming chlorides including vanadium; fractionally cooling the gas to obtain a titanium tetrachloride-rich condensate; and fractionally distilling the condensate. The product was titanium tetrachloride containing about 1% of color-forming impurities including vanadium chloride or oxychloride. The titanium tetrachloride was purified by adding 1% based on the weight of the titanium tetrachloride of an automobile engine lubricating oil having the trade name Texas Nabob oil, and refluxing the mixture for 70 minutes. A char formed which appeared to adsorb the color-forming impurities. From previous experience it is known that on filtration the resulting titanium tetrachloride would be fully useful for the manufacture of high quality titanium dioxide pigment.

To this solution at 125° C. was added 2.6% of technical grade aluminum chloride, analyzing 98.5% aluminum chloride on sublimation. The solution darkened rapidly and formation of flocs appeared to be complete in 90 minutes. The solution was pumped to a still and distilled at atmospheric pressure leaving a "heel" of solution which was rich in aluminum chloride. The distillate was condensed, and the liquid was free from solid material. It was fed to a flash volatilizer consisting of an electrically heated plate in a column supplied with a nitrogen-oxygen mixture preheated to 300° C. A gaseous stream of uniform composition containing nitrogen, oxygen, titanium tetrachloride resulted. Analysis showed that the stream contained 2.5% of aluminum chloride based on the weight of the titanium tetrachloride therein. The volatile chlorides in the gaseous stream were converted to pigmentary oxides by a method corresponding to that of U. S. Patent No. 2,635,946.

*Example 2*

A series of distillations was made upon titanium tetrachloride-aluminum chloride solutions containing from 1.5% to 4.6% of aluminum chloride by weight in which the distillate was continuously recycled to the still, and the distillands and vapors were analyzed. It was found that in each case the vapors contained less aluminum chloride than the distilland and that equilibrium in every instance was attained when the weight concentration of aluminum chloride in the gaseous mixture was 70% of the weight concentration of aluminum chloride in the distilland in the still, and that the composition of the evolved gas remained constant thereafter. Obtained at equilibrium, data are as follows:

| Percent AlCl₃ In Feed [1] | Percent AlCl₃ In Gas [1] | Ratio |
|---|---|---|
| 1.5 | 1.1 | 0.7 |
| 2.2 | 1.7 | 0.7 |
| 3 | 2.2 | 0.7 |
| 4.1 | 3.0 | 0.7 |
| 4.6 | 3.3 | 0.7 |

[1] Based on weight of titanium tetrachloride therein.

The foregoing demonstrates that although the boiling point of aluminum chloride and titanium tetrachloride are widely apart, a still delivers a titanium tetrachloride-aluminum chloride vapor of constant composition when a feed of constant composition is supplied thereto at the same rate as the liquid is distilled.

*Example 3*

The procedure of Example 1 was repeated except that the solution was filtered before distillation and the liquid level of the material in the still was kept constant by the addition of solution at the same rate as the mixture distilled. Samples of the evolved gas were analyzed from time to time and were found to contain 2.6% by weight of aluminum chloride.

*Example 4*

Titanium tetrachloride was purified by the method of Example 1 and 1.5% of crude aluminum chloride added. After 100 minutes of aging at 120° C. the solution was filtered, and 0.8% of silicon tetrachloride added. The mixture was pumped to a Dowtherm heated tank and heated to 130° C. The liquid was pumped through a rotometer and flash volatilized by spraying it into a plenum chamber surmounting a jacketed 11' high vertical column 4" in diameter heated at 300° C. through which a gaseous mixture of 1 mol of oxygen and 1 mol of nitrogen preheated to 200° C. rose. After volatilization of the titanium tetrachloride solution, the temperature of the gaseous stream was 180° C. This mixture was burned in a combustion chamber which it entered as a stream surrounded by an annular flame of separately admitted carbon monoxide and oxygen. Titanium dioxide of uniform pigmentary quality was obtained. The rotometer by which the rate of flow of the titanium tetrachloride liquid was determined showed no deposit of solid material after extended operation.

We claim:

1. A method of forming a gaseous stream comprising titanium tetrachloride and aluminum trichloride in a predetermined substantially constant percentage between about 0.1 and 5% of the weight of the titanium tetrachloride from liquid titanium tetrachloride and from crude aluminum trichloride containing material which reacts with hot titanium tetrachloride to form a non-volatile floc, which comprises dissolving said crude aluminum trichloride in substantially said predetermined percentage in hot liquid titanium tetrachloride, aging the solution until formation of a non-volatile floc is substantially complete, substantially completely distilling the solution, condensing and combining the distillate to form a condensate containing substantially said predetermined percentage of aluminum trichloride, and continuously flash volatilizing said combined distillate to form said stream.

2. A method of forming a gaseous stream comprising titanium tetrachloride and aluminum trichloride in a predetermined substantially constant percentage between about 0.1 and 5% of the weight of the titanium tetrachloride from liquid titanium tetrachloride containing color-forming impurities and from crude aluminum trichloride containing material which reacts with titanium tetrachloride to form a non-volatile floc, which comprises heating said titanium tetrachloride with an organic carbonizing agent until said impurities are rendered non-volatile by the char which forms, dissolving said crude aluminum trichloride in substantially said predetermined percentage in said titanium tetrachloride, aging the solution until formation of a non-volatile floc is substantially complete, substantially completely distilling the solution, condensing and combining the distillate to form a condensate containing substantially said predetermined percentage of aluminum trichloride, and continuously flash volatilizing said combined distillate to form said stream.

3. A process according to claim 2 wherein the aged solution is filtered before distillation.

4. A method of producing a gaseous titanium tetrachloride-aluminum trichloride stream containing aluminum trichloride in a predetermined substantially constant percentage between about 0.1 and 5% of the weight of the titanium tetrachloride from liquid titanium tetrachloride containing a vanadium chloride as an impurity and commercial aluminum trichloride, which comprises dissolving commercial aluminum trichloride in said titanium tetrachloride in substantially said predetermined percentage, heating the titanium tetrachloride-aluminum trichloride solution with an effective amount of an organic carbonizing agent until said vanadium chloride is rendered non-volatile by the char which forms and until formation of non-volatile floc is substantially complete, continuously supplying said solution to a still and continuously distilling said solution therein, and maintaining the rate of supply of said solution to said still substantially equal to the rate at which said solution is distilled.

5. A process according to claim 4 wherein the aged solution is filtered before it is supplied to the still.

6. A method of producing a gaseous titanium tetrachloride-aluminum trichloride stream of uniform composition from liquid titanium tetrachloride and from crude aluminum trichloride which comprises dissolving a predetermined percentage between about 0.1%–5% by weight of said crude aluminum trichloride in said titanium tetrachloride, aging the solution at elevated temperature until formation of a non-volatile floc is substantially complete, filtering the solution, and continuously flash volatilizing a stream of said solution to form said stream.

7. A method of producing a gaseous titanium tetrachloride-aluminum trichloride stream containing aluminum trichloride in a predetermined substantially constant percentage between about 0.1 and 5% of the weight of the titanium tetrachloride from liquid titanium tetrachloride containing a vanadium chloride as an impurity and commercial aluminum trichloride, which comprises dissolving commercial aluminum trichloride in said titanium tetrachloride in substantially said predetermined percentage, heating the titanium tetrachloride-aluminum trichloride solution with an effective amount of an organic carbonizing agent until said vanadium chloride is rendered non-volatile by the char which forms and until formation of non-volatile floc is substantially complete, continuously supplying said solution to a still and continuously distilling said solution therein, removing solids from the distilland in said still by bleeding off the distilland from said still and maintaining the volume of distilland in said still substantially constant by supplying thereto a solution of titanium tetrachloride containing aluminum chloride in the concentration present in said distilland.

8. A method of producing a gaseous stream comprising titanium tetrachloride and aluminum trichloride in a predetermined relatively constant percentage between about 0.1 and 5% of the weight of the titanium tetrachloride from liquid titanium tetrachloride and commercial aluminum chloride which contains impurities forming an insoluble floc in the presence of hot liquid titanium tetrachloride, which comprises dissolving substantially said predetermined percentage of aluminum in hot liquid titanium chloride, aging the hot solution until the formation of the insoluble floc is substantially complete, separating insoluble floc from the aged solution, and continuously flash volatilizing a hot stream of the resulting solution to form said gaseous stream.

References Cited in the file of this patent

UNITED STATES PATENTS

| Number | Name | Date |
|---|---|---|
| 2,230,538 | Jenness et al. | Feb. 4, 1941 |
| 2,333,948 | Muskat | Nov. 9, 1943 |
| 2,347,496 | Muskat et al. | Apr. 25, 1944 |
| 2,437,171 | Pechukas | Mar. 2, 1948 |
| 2,441,225 | Pechukas | May 11, 1948 |
| 2,559,638 | Krchma et al. | July 10, 1951 |
| 2,560,424 | Espenschied | July 10, 1951 |
| 2,689,781 | Schaumann | Sept. 21, 1954 |